(12) United States Patent
Hurwitz

(10) Patent No.: US 9,576,248 B2
(45) Date of Patent: Feb. 21, 2017

(54) RECORD LINKAGE SHARING USING LABELED COMPARISON VECTORS AND A MACHINE LEARNING DOMAIN CLASSIFICATION TRAINER

(71) Applicant: Adam M. Hurwitz, New York, NY (US)

(72) Inventor: Adam M. Hurwitz, New York, NY (US)

( * ) Notice: Subject to any disclaimer, the term of this patent is extended or adjusted under 35 U.S.C. 154(b) by 416 days.

(21) Appl. No.: 14/203,784

(22) Filed: Mar. 11, 2014

(65) Prior Publication Data

US 2014/0358829 A1    Dec. 4, 2014

Related U.S. Application Data

(60) Provisional application No. 61/830,088, filed on Jun. 1, 2013.

(51) Int. Cl.
G06F 15/18    (2006.01)
G06N 99/00    (2010.01)
G06F 17/30    (2006.01)

(52) U.S. Cl.
CPC ....... *G06N 99/005* (2013.01); *G06F 17/30303* (2013.01)

(58) Field of Classification Search
CPC .................................................. G06F 17/3069
USPC ....................................................... 706/12, 45
See application file for complete search history.

(56) References Cited

U.S. PATENT DOCUMENTS

| | | | |
|---|---|---|---|
| 7,900,052 B2 | 3/2011 | Jonas | |
| 8,095,386 B2 | 1/2012 | Lassetter | |
| 8,356,037 B2 | 1/2013 | Basu | |
| 8,489,455 B2 | 7/2013 | Basu | |
| 8,521,758 B2 | 8/2013 | Nachnani | |
| 8,620,930 B2 | 12/2013 | Gulhane | |
| 2006/0179050 A1 | 8/2006 | Giang | |
| 2007/0174277 A1* | 7/2007 | Giang | G06F 17/30489 |
| 2008/0109459 A1 | 5/2008 | Trepetin | |
| 2009/0307201 A1* | 12/2009 | Dunning | G06F 17/30743 |

(Continued)

OTHER PUBLICATIONS

Fellegi et al., A Theory for Record Linkage, 1969, Journal of the American Statistical Association, vol. 64, pp: 1183-1210.*

*Primary Examiner* — David Vincent
(74) *Attorney, Agent, or Firm* — IDP Patent Services; Olav M. Underdal

(57) ABSTRACT

Herein disclosed is a system and method for record linkage that uses machine learning to link records, so that many users can contribute their training data to a shared repository and employ the accumulated training data without any user having to share their actual data. The system includes a record linkage server, which further includes a record linkage repository, a domain classifier, and a domain classification trainer. The record linkage server is connected with a record linkage client, which includes a field comparator and a manual label prompter. Further disclosed is a method for record linkage, describing how two structured data sets can be matched, including searching domains, loading data sets, loading domain, matching fields, iterating record linking for all record pairs, including: selecting record pair, calculating comparison vector, calculating label probabilities, determining label, optionally setting label manually, updating prior probabilities, optionally confirming selected label, and updating training data.

18 Claims, 4 Drawing Sheets

(56) References Cited

U.S. PATENT DOCUMENTS

| | | | |
|---|---|---|---|
| 2010/0198756 A1* | 8/2010 | Zhang | G06F 17/30985 706/12 |
| 2013/0117101 A1 | 5/2013 | Basu | |
| 2013/0238623 A1* | 9/2013 | Wyllie | G06F 17/30303 707/737 |
| 2013/0290092 A1 | 10/2013 | Basu | |

* cited by examiner

System for Sharing Record Linkage Information

Record Linkage Server

Record Linkage Client

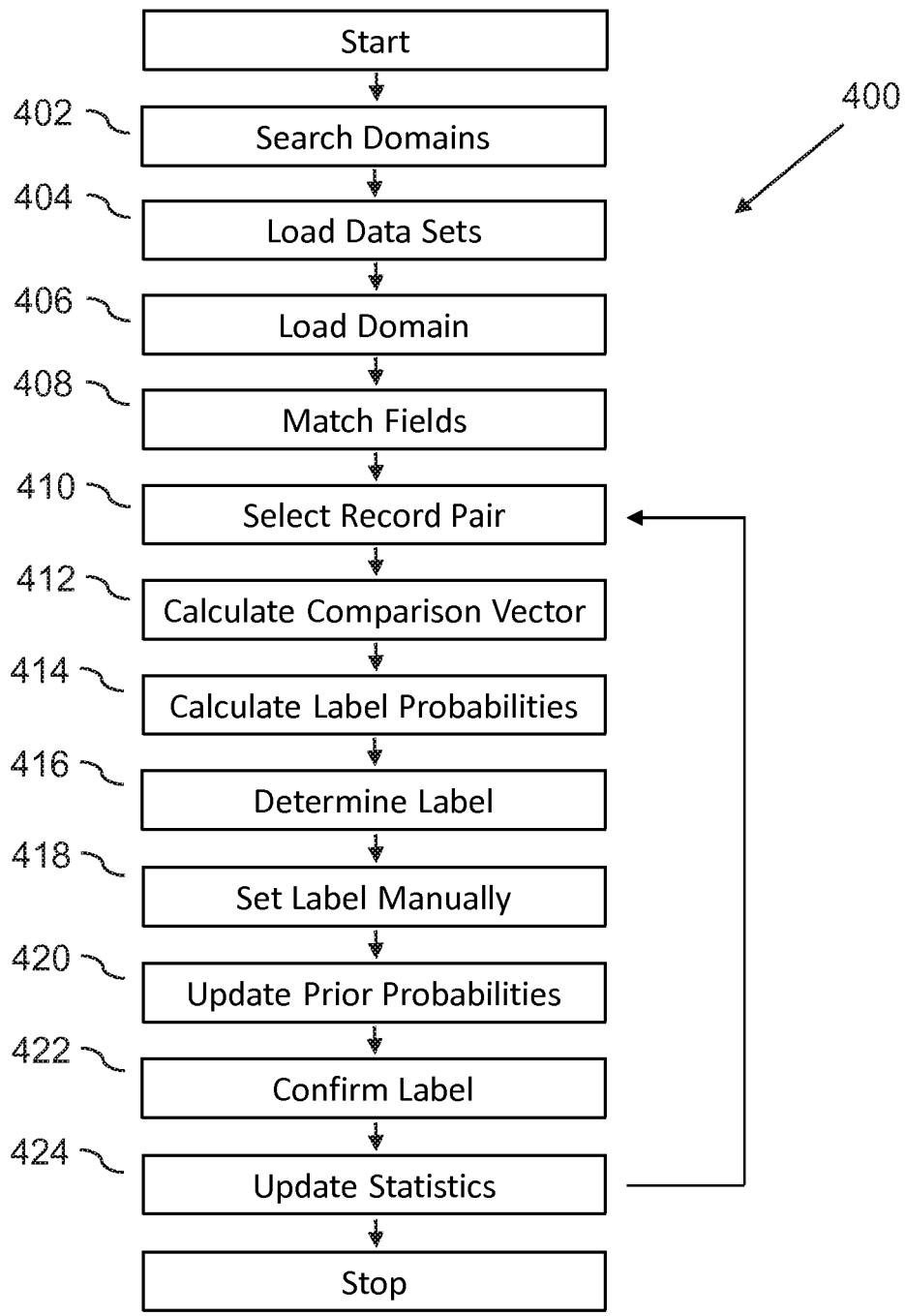

RECORD LINKAGE SHARING USING LABELED COMPARISON VECTORS AND A MACHINE LEARNING DOMAIN CLASSIFICATION TRAINER

CROSS-REFERENCE TO RELATED APPLICATIONS

This application claims the benefit of U.S. Provisional Application No. 61/830,088, filed Jun. 1, 2013.

FIELD OF THE INVENTION

The present invention relates generally to the field of record linkage, the problem of identifying records in a data set that refer to the same entity across different data sources. More particularly, this invention describes systems and methods of sharing linkage information for the purpose of creating large sets of validated training data for use in automated machine learning methods of record linkage.

BACKGROUND OF THE INVENTION

Record linking is the task of finding records that refer to the same object across data sets. It is also known as data matching. This is a common data management problem faced whenever two data sets need to be combined or joined. The objects are the real-world artifacts the records refer to and the fields of the record are the attributes of the object. It is often the case that there is no common identifier between the two data sets. In this case, the fields need to be matched between the two data sets, and then for each combination of records between the two data sets, the data in each field are compared to determine whether any two records refer to the same object or entity.

It is understood that the objects, which are being matched have common, generally accepted attributes. It is common in data management to refer to an area of objects and their attributes as a domain. There are a number of domains that people apply record linking to. For instance, people is a very common domain for record linking. For the people domain, the data sets are comprised of records that have name and address information. These records can for example refer to customers at a financial institution or patients at a hospital. Another common domain for record linking is product information. In this domain, the data sets can contain the name, manufacturer, and descriptions of products.

There are a number of systems that have been created, which use machine learning, including statistics, probability, and other methods, to determine when two records match each other in a pair of data sets. There are generally accepted ways to compare data that are then used by the machine-learning algorithm. These systems require a set of training data where a human user has specified pairs of records as matching or not matching. The training data is used to train a machine learning algorithm so that it can determine whether the rest of the pairs of data under consideration are matches or not automatically.

The biggest problem that these systems face is the creation of training data. It is time consuming for a person to review pairs of records from two data sets to determine whether they match or not. It is a generally held belief in the machine learning community that the larger the set of training data the better the system will work. More training data means that the machine learning algorithm, no matter which one is used, will be better trained and better able to automatically match records.

It is almost always the case that the data being matched in record linking systems is either private or sensitive information. For each domain, there is usually a requirement to keep the information in the data sets private, whether for regulatory and legal reasons, or for competitive reasons.

Thus, when a company performs record linking on their data in a domain, there is no way to utilize the training data that another company has created in the same domain. There is no way to share training data with other companies in a way that adheres to regulatory, legal, and competitive requirements.

As such, considering the foregoing, it may be appreciated that there continues to be a need for novel and improved devices and methods for performing record linking, while allowing users to share training data in a secure manner.

SUMMARY OF THE INVENTION

The foregoing needs are met, to a great extent, by several aspects of the present invention, which provide enhancements to the existing model of record linkage.

Aspects of this invention describe a system and method that use machine learning to link records, so that many users can contribute their training data to a shared repository and make use of the accumulated training data from other users of the system without any user having to share their actual data.

An aspect of this invention provides for shared definitions of domains and shared functions to compare fields of data in a domain. In this aspect, users are then able to access the accumulated set of training data for a domain to train a machine-learning algorithm to match records automatically, more efficiently than they would without access to such a set of information.

In an aspect of this invention, a system for sharing record linkage information can comprise:
  a. a record linkage server, further comprised of a record linkage repository and linkage services; and
  b. a record linkage client that interacts with the record linkage server.

In a related aspect, multiple users can register and use the system for record linking. The central repository contains the definition of domains and the fields that comprise the domain. Comparator functions are associated with each field of a domain, which output a number quantifying the difference between two data values for the field. A comparison vector is a set of the output of comparator functions for all the fields for two records in a domain. The central repository contains a set of labeled comparison vectors for each domain, with the labels of match and unmatch. The central system has classifiers trained on the training data for each domain.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a flowchart illustrating steps that may be followed in accordance with one embodiment of a method for sharing record linkage information.

DETAILED DESCRIPTION

Figure 1:
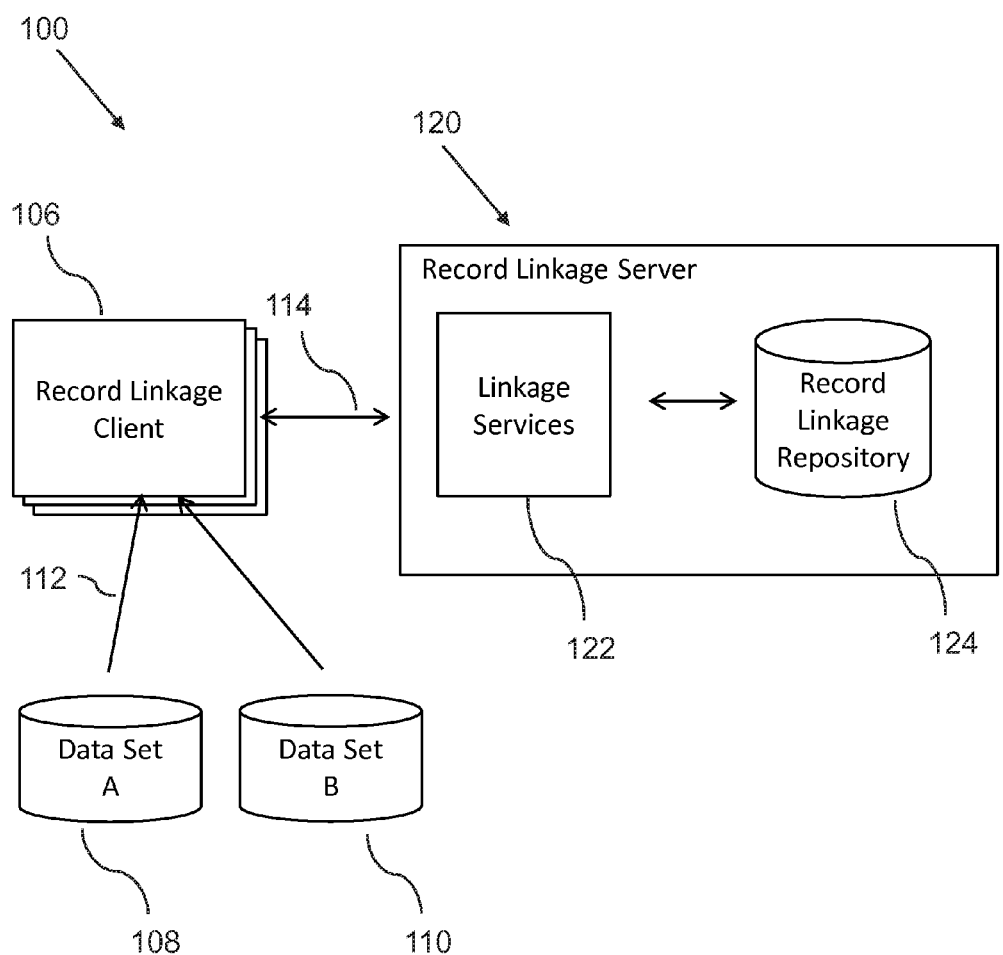
FIG. 1 is a schematic diagram illustrating a system for sharing record linkage information according to an embodiment of the invention.
Figure 2:
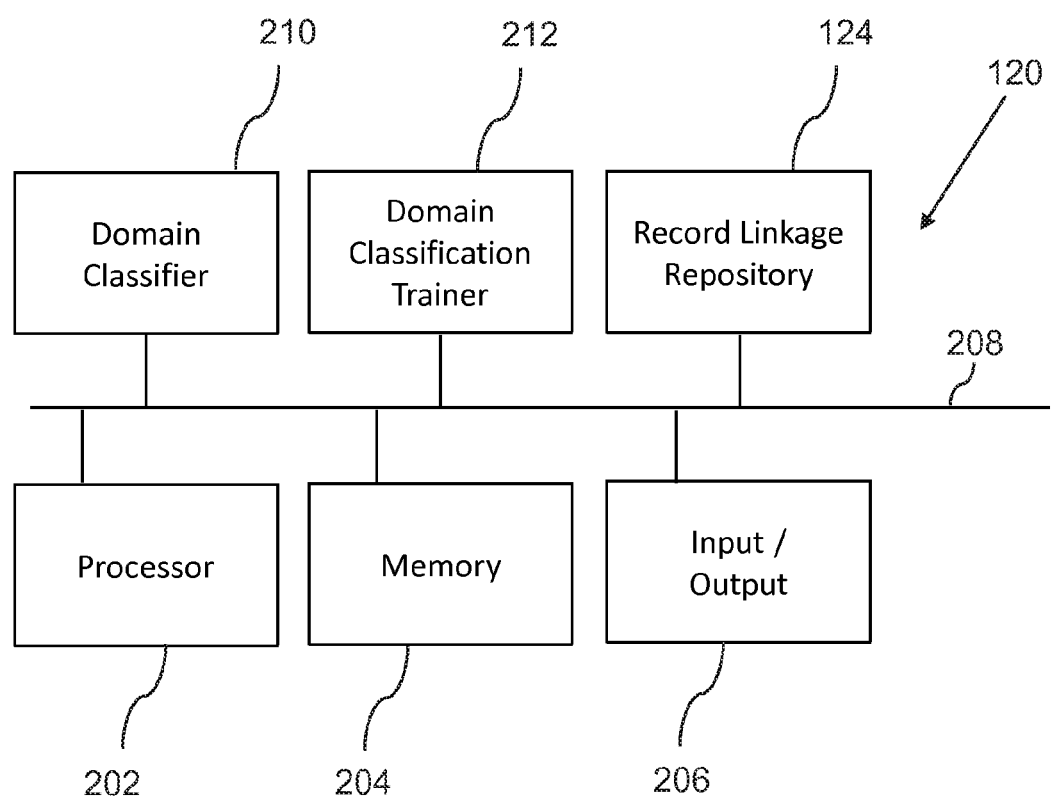
FIG. 2 is a schematic diagram illustrating a record linkage server according to an embodiment of the invention.

In the following, we describe the structure of an embodiment of a system for sharing record linkage information in the form of a computer-implemented system with reference to FIG. 1, in such manner that like reference numerals refer to like components throughout; a convention that we shall employ for the remainder of this specification.

In an embodiment, a system for sharing record linkage information 100 can be comprised of:
  a. a record linkage server 120, wherein the record linkage server is further comprised of
    i. a linkage services component 122, which processes domain classifications, performs domain classification training, and stores record linkage information;
    ii. a record linkage repository 124, that contains domain definitions and record linkage training data, and can be accessed and interacted with by the linkage services component;
  b. a record linkage client 106, which can processes record linkage functions for a user;
  Wherein the user can employ the record linkage system 100, communicating via the record linkage client 106, to perform record linking on data sets A 108 and B 110, each containing records for record linkage, wherein both A 108 and B 110 have fields, which are matched to a domain stored in the record linkage repository 124;
  wherein further the record linkage client 106 calls the domain classification function on the record linkage server 120 to calculate a comparison vector and perform a sensitivity analysis to determine the label of the comparison vector;
  whereby a plurality of users can share record linkage domain information stored in the record linkage repository, and perform record linking via the domain classifier of the record linkage server.

In a related embodiment the record linkage server 120 can be comprised of a processor 202; a memory 204; an input/output component 206; the linkage services 122, further comprised of a domain classifier 210, a domain classification trainer 212, a record linkage repository 124; all components connected via a data bus 208.

Figure 3:
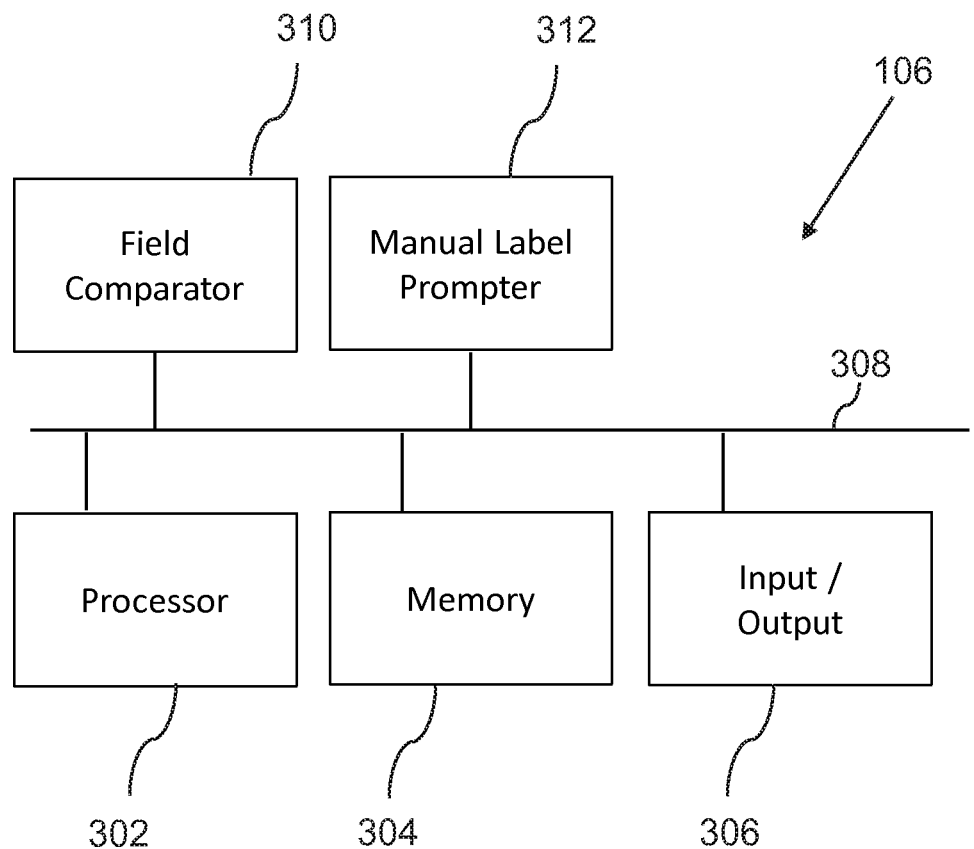
FIG. 3 is a schematic diagram illustrating a record linkage client according to an embodiment of the invention.

In another related embodiment, as illustrated in FIG. 3, the record linkage client 106, can include a processor 302, a memory 304, an input/output component 306, a field comparator 310, a manual label prompter 312, all connected via a data bus 308.

In an embodiment, the record linkage client 106 communicates with the record linkage server 120 over the network 114, which can be the general Internet, a Wide Area Network or a Local Area Network, or another form of communication network, transmitted on wired or wireless connections.

It shall be understood that an executing instance of an embodiment of the system for sharing record linkage information 100, as shown in FIG. 1, can include a plurality of record linkage clients 106, which are each tied to at least one user.

It shall be understood that the above mentioned components of the record linkage server 120 and the components of the record linkage client 106 are to be interpreted in the most general manner, so that for example the processor 202 and the processor 302, can include a single physical microprocessor or microcontroller, a cluster of processors, a datacenter or a cluster of datacenters, a computing cloud service, and the like; the memory 204 and the memory 304, can includes random access memory and other forms of temporary storage, and hard disks, hard disk clusters, cloud storage services, and other forms of permanent storage; and the input/output 206 and the input/output 306, can include a plurality of well-known input/output devices, such as screens, keyboards, pointing devices, motion trackers, and so forth.

Furthermore, it shall be understood that both the record linkage server 120 and the record linkage client 106 can include a number of other components that are well known in the art of general computer devices, and therefore shall not be further described herein. This can include system access to common functions and hardware, such as for example via operating system layers such as Windows, Linux, and similar operating system software, but can include configurations wherein application services are executing directly on server hardware or via a hardware abstraction layer other than a complete operating system.

In a related embodiment, the record linkage repository 124 can contain information about a set of domains. A domain describes objects that data refer to. A domain is defined as having a name, a description, and a set of fields. Each field has a name, a data type, and a comparator function defined for it.

A comparator function is a function that takes two data values as input and generates an output in the form of a number, which quantifies the difference between the two data values. Examples of comparator functions for string data are the Levenshtein distance algorithm, the Jaro-Winkler distance, and the Soundex algorithm. Similarly, there are well-known comparator functions for numeric and date-time data.

When two records of a Domain are compared, it means that the data in each field is input to the comparator function defined for that field and the numerical output, d, is collected to form a comparison vector, $cv=<d_1, \ldots, d_n>$.

For record linking the comparison vector for a pair of records is labeled as 'match' or 'unmatch' for when the compared records are respectively the same and or not the same.

In a related embodiment, the record linkage repository 124 can contain a set of labeled comparison vectors for each domain in the form: $<d_1, \ldots, d_n, L>$ where L is the label.

In a further related embodiment, a user can employ the record linkage system 100 to perform record linking on two sets of structured data, data set A 108 and data set B 110, via a record linkage client 106. The data sets have fields, which are matched to a domain in the system. The record linkage client 106 takes a record from each data set 108 110 for each combination of records in the two data sets. The field comparator 310 of the record linkage client 106 uses the comparator functions on each field for the two records to quantify the difference between the data values. The output of the set of comparator functions are put together to form a comparison vector. The record linkage client 106 calls the domain classifier 210 on the record linkage server 120 to calculate a label probability and perform a sensitivity analysis to determine the label of the comparison vector. The system has a sensitivity threshold for the match label probability, below which the manual label prompter 312 of the record linkage client 106 prompts the user to label the comparison vector manually. The manually labeled vector is transferred and stored in the record linkage repository 124 on the record linkage server 120.

In a further related embodiment, the record linkage repository 124 can store the training data as a set of labeled comparison vector samples for each domain: $<D_k, \{<<d_1, \ldots, d_n, L>\}>$.

In a related embodiment, the domain classification trainer 212 can train the classification functions with the training data for each domain, stored in the record linkage repository 124, via well-known methods of machine learning, including neural networks, genetic algorithms, support vector machines, and cluster classification.

In a related embodiment, the training data can be downloaded from the record linkage server 120 by an external system, for purposes of creating a specific classifier using other classification methods provided by the external system, such that the new classifier can subsequently be uploaded to the record linkage server 120.

In a related embodiment, one or both of the data sets 108 and 110 can be stored in the record linkage repository 124. This can for example be useful for storage of reference data.

In a related embodiment, the labels can be customized with values that are matched to a particular domain. In a further related embodiment, the match label can be extended with match sub-labels, which for example can distinguish the match types.

In further related example embodiment, the match label can be extended with match-domestic and match-business as customized match labels for an address domain. In an alternative example the match labels could be match-domestic-apartment, match-domestic-house, match-business-small, match-business-medium, match-business-large, such that the customized match labels provide information on whether it is a home or business address and further information on the type of home or business.

In a related embodiment, the comparator functions can have a standardized output so that they can be interchangeably used for the same field. A standardized output can for example be a discrete numeric ranking, such as a ranking from 1 to 10.

In a related embodiment, new domains can be defined and customized by a user.

In a further related embodiment, the record linkage can identify and process fields that are not specified in the domain.

FIG. 4 illustrates an overview of a related embodiment, where in order to match two structured data sets with records that refer to the same kind of object, A and B, a method or process of sharing record linkage information, can comprise the following steps or acts:

a. Searching domains 402, comprising searching the domains in the server record linkage repository, and selecting a domain, D, that describes the objects in A and B. The selection can be manually performed by a user, or it can be automated via use of a similarity matching function, which compares field value and types, to calculate an overall similarity ranking.

b. Loading data sets 404, comprising loading data sets A and B to the local memory.

c. Loading domain 406, comprising retrieving D and its related information, including the fields and comparator functions associated with each field.

d. Matching fields 408, comprising matching the fields in data sets A and B to the fields in D. This matching can be done manually by a user, or can be semi-automated or fully automated.

e. Performing the record linking function by the local processor, com:
  i. Selecting record pair 410, comprising selecting a pair of records <a, b>, where a and b are selected respectively from A and B;
  ii. Calculating comparison vector 412, comprising calculating a comparison vector cv for the pair <a, b>;
  iii. Transferring cv to the server record linkage repository;
  iv. Calculating label probabilities 414, comprising calculating the probability of cv having each label based on the statistics of the comparison vectors in the repository for the domain;
  v. Determining label 416, comprising determining the label by a server calculation and returning the label with values: M, U, or R;
  vi. Setting label manually 418, comprising conditionally setting the label manually, so that If the label is R, the client program prompts the user to input the label, L, for <a, b>.
  vii. Updating prior probabilities 420, comprising updating the prior probabilities, so that if the label is M or U, the server increments a counter associated with the respective label.
  viii. Confirming label 422, wherein a user can optionally confirm the label, such that when the user labels <a, b>, the cv and L are transferred to the Server and appended to the list of labeled comparison vectors associated with D.
  ix. Updating training date 424, wherein the server updates the training data for data that has been manually labelled.

f. Reiterating the above steps of e. Performing the record linking function with the next pair of records until all combinations of the data sets A and B have been compared.

In a related embodiment, re-training of classification functions in the domain can be performed periodically for data that was manually labeled. Such retraining can for example be performed on a daily or weekly basis, or after a pre-determined number of manual labels.

In a related embodiment, the probability calculation can employ the Bayes decision rule for minimum error, whereby the label assignment can be defined as follows:

$$L = \begin{matrix} M & \text{if } \frac{p(cv|M)}{p(cv|U)} > \frac{p(U)}{p(M)} \\ U & \text{otherwise} \end{matrix}$$

Where M is the label Match and U is the label Unmatch. cv is the comparison vector. p(U) and p(M) are the prior probabilities of being Unmatch and Match.

In a further related embodiment, a label R for Reject can be defined by way of a variable S called the sensitivity, so that if the difference is within a defined sensitivity neither the M or U label are given and the comparison is rejected:

$$L = R \text{ if } \text{abs}\left(\frac{p(cv \mid M)}{p(cv \mid U)} - \frac{p(U)}{p(M)}\right) < S$$

In related embodiments, the calculation for the conditional probabilities can utilize the Naïve Bayes assumption, whereby the elements of the comparison vector are assumed to be conditionally independent, so that the probabilities can be defined as:

a. $p(cv|M)=\Pi_{i=1 \to n} p(d_i|M)$ b. $p(cv|U)=\Pi_{i=1 \to n} p(d_i|U)$

In a related embodiment, the well-known principle of blocking can be used to improve efficiency, by restricting comparisons to records for which one or more particularly discriminating fields match.

In a related embodiment of the method for record linking, the sets A and B can be only partially related to D, so that the record linkage is applied only to fields that are supported by D.

In a related embodiment, the record linkage client 106 can be:
 a. A Web application, executing in a Web browser;
 b. A tablet app, executing on a tablet device, such as for example an Android or iOS tablet device;
 c. A mobile app, executing on a mobile device, such as for example an Android phone or iPhone;
 d. A desktop application, executing on a personal computer, or similar device;
 e. An embedded application, executing on a processing device, for example a home entertainment device, a kiosk, a smart TV, a game console or other system.

In a related embodiment, sensitivity for matching can be adjusted by the user.

In a related embodiment, the record linkage client 106 can retrieve the set of labeled comparison vectors from the record linkage server 120, so that the user can use their own machine learning algorithm for record linking.

In related embodiments, the systems and the methods for sharing record linkage information can be applied within a singular domain, or within a plurality of domains.

In a related embodiment, the data sets A 108 and B 110 can be identical, whereby the methods described herein, can be used to check for duplicates in a domain.

In a related embodiment, a function, transformation, or method can be related to a label value, so that this function, transformation, or method is applied subsequently to determination of the label value. As an example, the embodiment described previously herein, which upon the determination of label value R, initiates a user prompting process for manually setting the label value, can in this embodiment be defined by a specific user prompting method related to the label with value R.

In a related embodiment, upon the determination of a record match, either the first or the second record can be retained, or a record can be combined by applying a predetermined selection function on each pair of field values in the domain.

In a related embodiment, in a case when two data sets are compared, and the data sets contain one or more fields that are not present in the applied domain, a comparator function can use a Gaussian/normal distribution, so that the median value of the distribution separates the M and U labels. In a further related embodiment, the comparator function can be other functions that satisfy the criteria for a probability distribution, herein included any well-known probability distributions.

In a further related embodiment, direct methods of determining a label that may or may not produce a probability estimation can be employed, including a neural network, which has been trained on test data in the domain.

FIGS. 1, 2, 3 and 4 are block diagrams and flowcharts methods, devices, systems, apparatuses, and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts computer devices of an embodiment, the record linkage client 106, and the record linkage server 120, which both contain several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include random access memory (RAM) and read-only memory (ROM). The computer also may include nonvolatile storage memory, such as a hard disk drive, where additional data can be stored.

FIG. 1 shows a depiction of an embodiment of the system for sharing record linkage information 100, including the record linkage server 120. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as Amazon EC2 or Microsoft Azure.

It shall be understood that the above-mentioned components of the record linkage server 120 and the record linkage client 106 are to be interpreted in the most general manner.

For example, the processor 202 and the processor 302 can each respectively include a single physical microprocessor or microcontroller, a cluster of processors, a datacenter or a cluster of datacenters, a computing cloud service, and the like.

In a further example, the memory 204 and the memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the record linkage server 120 and the record linkage client 106 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the record linkage server 120 and the record linkage client 106. The components of the record linkage server 120 can be distributed over a plurality of physical, logical, or virtual servers. Parts or all of the components of the record linkage client 106 can be configured to operate in the record linkage server 120, whereby the record linkage client 106 functions as a thin client, performing only graphical user interface presentation and input/output functions. Alternatively, parts or all of the components of the record linkage server 120 can be configured to operate in the media-record linkage client 106. In yet another alternative embodiment, the record linkage repository 124 can be operating separately from the record linkage server 120, for example executing on a separate server, a storage area network, or a cloud based storage service.

Many such alternative configurations are readily apparent, and should be considered fully included in the above disclosure. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for sharing record linkage information, comprised of:
   a) a record linkage server, wherein the record linkage server is further comprised of:
      a linkage services component, which is configured to processes domain classifications;
      a record linkage repository, wherein the record linkage repository stores in non-transitory server memory: shared record linkage training data from a plurality of users and information for a set of domains, wherein each domain comprises a set of fields, such that each field comprises a comparator function and a set of labeled comparison vectors;
      wherein the linkage services component communicates with the record linkage repository in order to store, access and process data stored by the linkage services repository;
   b) a record linkage client, wherein the record linkage client communicates with the record linkage server over a network, to processes record linkage functions for a user;
      wherein the user employs the record linkage system, communicating via the record linkage client, to perform record linking on a first data set and a second data set, wherein both the first and second data sets have fields, which are matched to a domain stored in the record linkage repository;

wherein further the record linkage client calls the linkage services component on the record linkage server, such that the linkage services component calculates a comparison vector and via a classification function performs a sensitivity analysis to determine the label of the comparison vector;

wherein the linkage services component is further configured with a domain classification trainer, such that the domain classification trainer is configured to train classification functions with the training data for each domain, stored in the record linkage repository, via a method of machine learning;

such that the plurality of users share record linkage domain information stored in the record linkage repository, and perform record linking via the domain classifier of the record linkage server, such that the plurality of users do not have access to the shared record linkage training data;

whereby a user is enabled to perform record linking and add information for a domain to the training data, such that the training data is used to train the classification functions for the domain.

2. The system for sharing record linkage information of claim 1, wherein the training data are configured to be downloaded by an external system from the record linkage server, wherein the external system is configured to perform a classification of the training data, and the re-classified training data is configured to be uploaded to the record linkage server by the external system;

whereby a specific classifier is created using classification methods provided by the external system.

3. The system for sharing record linkage information of claim 1, wherein the labels are configured with values that are matched to a particular domain.

4. The system for sharing record linkage information of claim 1, wherein the comparator functions are configured with a standardized output, such that they are configured to be interchangeably used for the same field.

5. The system for sharing record linkage information of claim 1, further configured such that the user is enabled to define and customize new domains.

6. A record linkage server, comprising
a) a processor;
b) a non-transitory memory;
c) an input/output;
d) a record linkage repository; wherein the record linkage repository stores in the non-transitory memory: shared record linkage training data from a plurality of users and information for a set of domains, wherein each domain comprises a set of fields, such that each field comprises a comparator function and a set of labeled comparison vectors;
e) a domain classifier, which is configured to calculate a label probability and for each domain in the record linkage repository comprises a classification function; and
f) a domain classification trainer, which is configured to train classification functions with the training data for each domain, stored in the record linkage repository, such that the classification training is performed via a method of machine learning;

wherein the record linkage server is configured to perform record linking on a first data set and a second data set, wherein both the first and second data sets have fields, which are matched to a domain stored in the record linkage repository;

wherein further the domain classifier is configured to calculate a comparison vector and via a classification function perform a sensitivity analysis to determine the label of the comparison vector;

such that the plurality of users share record linkage domain information stored in the record linkage repository, and perform record linking via the domain classifier of the record linkage server, such that the plurality of users do not have access to the shared record linkage training data;

whereby the plurality of users are enabled to perform record linking and add information for a domain to the training data, during record linking, such that the training data is used to train the classification functions for the domain.

7. The record linkage server of claim 6, wherein the domain classifier is configured to use bayes decision rule for minimum error.

8. The record linkage server of claim 6, wherein the domain classifier is configured to calculate conditional probabilities by utilizing the naïve bayes assumption, such that the elements of a comparison vector are assumed to be conditionally independent.

9. The record linkage server of claim 6,
wherein the training data are configured to be downloaded by an external system from the record linkage server, wherein the external system is configured to perform a classification of the training data, and the re-classified training data is configured to be uploaded to the record linkage server by the external system;

whereby a specific classifier is created using classification methods provided by the external system.

10. The record linkage server of claim 6, wherein the comparator functions are configured with a standardized output, such that they are configured to be interchangeably used for the same field.

11. A method for sharing record linkage information from a plurality of users, comprising:
a) searching domains, comprising selecting a matching domain from a central repository, which describes the objects in both a first data set and a second data set;
b) loading data sets, comprising loading the first and the second data sets to a non-transitory memory;
c) loading domain, comprising retrieving information related to the matching domain, including fields and comparator functions associated with each field;
d) matching fields, comprising matching the fields in the first and second data sets to the fields in the matching domain, wherein the matching is done manually by a user, or is semi-automated or fully automated;
e) performing record linking by a processor, wherein the record linking further comprises:
selecting record pair, comprising selecting a pair of records, comprising a first record and a second record, such that the first record and the second record are selected respectively from the first data set and the second data set;
calculating comparison vector, comprising calculating a comparison vector for the pair of records, and storing the comparison vector in the central repository;
calculating label probabilities, comprising calculating a probability of the comparison vector having each label based on the statistics of the comparison vectors in the matching domain;
determining label, comprising determining a label by a processor calculation and returning the label with a label value, selected from the set of possible label values: matched, unmatched, and rejected;

setting label manually, comprising conditionally setting the label manually, so that if the label value is set to rejected, a user is prompted to select the label for the pair of records;

updating prior probabilities, comprising updating the prior probabilities, so that if the label is matched or unmatched, the processor increments a counter associated with respectively the matched or unmatched label;

f) repeating e) performing record linking with a next pair of records until all combinations from the first and second data sets have been compared;

such that the plurality of users share the record linkage information and perform record linking, without having access to the shared record linkage information.

12. The method for sharing record linkage information of claim 11, wherein e) performing record linking further comprises:

confirming selected label, wherein the user confirms the label for the pair of records, and the comparison vector and label are appended to a central list of labeled comparison vectors associated with the matching domain.

13. The method for sharing record linkage information of claim 12, wherein e) performing record linking further comprises:

updating training data, comprising updating stored training data, if the label was manually confirmed.

14. The method for sharing record linkage information of claim 13, wherein re-training of classification functions in the domain is performed periodically for data that was manually labeled.

15. The method for sharing record linkage information of claim 11, wherein the label assignment is configured to use bayes decision rule for minimum error.

16. The method for sharing record linkage information of claim 11, wherein the label assignment is configured to use a predetermined sensitivity value to reject a match if the bayes difference is within the sensitivity value.

17. The method for sharing record linkage information of claim 11, wherein the calculation for the conditional probabilities utilizes the naïve bayes assumption, such that the elements of the comparison vector are assumed to be conditionally independent.

18. The method for sharing record linkage information of claim 11, wherein the act of repeating record linking with a next pair of records for all combinations of record pairs uses the principle of blocking to improve efficiency, by restricting comparisons to record pairs for which one or more particularly discriminating fields match.

* * * * *